May 12, 1936.  A. MARSEILLES  2,040,751
CULTIVATOR
Filed May 29, 1935
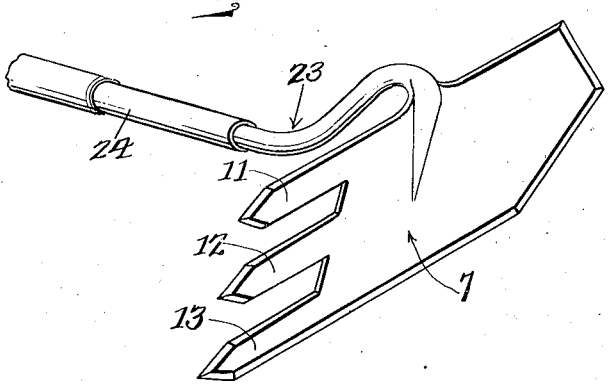
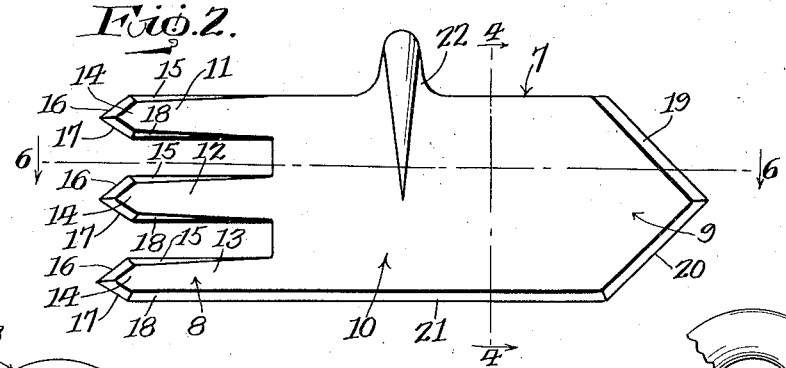
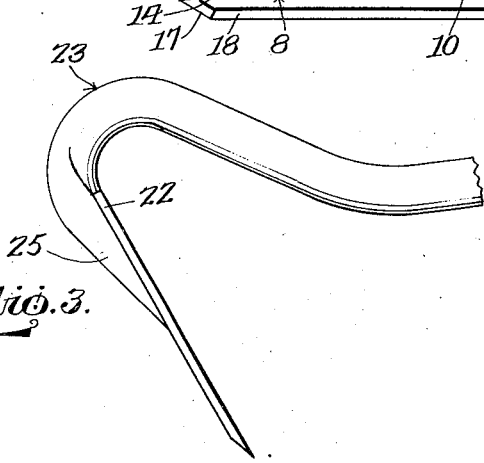
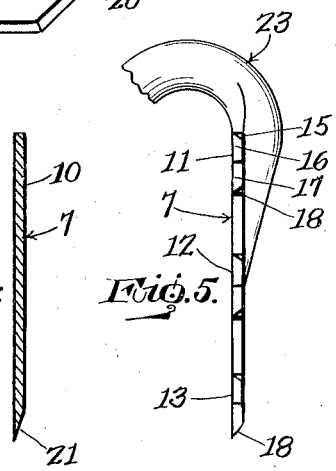
Inventor
Anthony Marseilles
By Geo. F. Kimmel
Attorney Patented May 12, 1936

2,040,751

UNITED STATES PATENT OFFICE 2,040,751

CULTIVATOR

Anthony Marseilles, Mystic, Conn.

Application May 29, 1935, Serial No. 24,113

3 Claims. (Cl. 97—66)

My invention relates to a cultivator designed primarily for cultivating gardens, but it is to be understood that the cultivator is for use in any connection for which it may be found applicable.

My invention has for its object to provide, in a manner as hereinafter set forth, a cultivator so formed as to enable it to be used for hoeing, raking, cutting and furrowing purposes.

Further objects of my invention are to provide, in a manner as hereinafter set forth, a cultivator so formed as to go close to any vegetation to enable it to readily remove weeds or other matter at a point in close proximity to the vegetation; to cultivate in between growing plants; to make furrows and holes for planting; to break hard, crusted ground; to quickly pick up weeds after they have been cut; and to cultivate hedges.

Further objects of my invention are to provide, in a manner as hereinafter set forth, a cultivator for the purposes referred to which is simple in its construction, strong, durable, compact, conveniently used, thoroughly efficient for the purposes intended thereby and inexpensive to manufacture.

With the foregoing and other objects which may hereinafter appear, my invention consists of such parts as will be specifically described and as illustrated in the accompanying drawing, wherein is shown the preferred embodiment of the invention, but it is to be understood that changes, variations and modifications may be resorted to which fall within the scope of the invention as claimed.

In the drawing:

Figure 1 is a perspective view of the cultivator with the handle therefor broken away, Figure 2 is a front elevation thereof, Figure 3 is an elevation looking towards one of the side edges of the cultivator, Figure 4 is a section on line 4—4, Figure 2, Figure 5 is an elevation looking towards the other side edge of the cultivator, and Figure 6 is a section on line 6—6, Figure 2.

The cultivator includes a blade-like body part 7 formed of a pair of end portions 8, 9 and an intermediate portion 10 of rectangular contour and of greater length than either of the end portions. The end portion 8 is formed of a series of flat parallel spaced sections 11, 12 and 13 which are integral at their inner ends with and are flush with one end of the intermediate portion 10. The end portion 9 is tapered and merges at its inner end into the other end of the intermediate portion 10. The end portion 8 is of greater length than end portion 9. The sections 11, 12, and 13 are of substantial oblong contour and have tapered outer end parts 14. The outer lengthwise edges of the sections 11 and 13 are flush with the edges of section 10. The side and outer end edges of each of the sections 11, 12, and 13 are beveled to form cutting edges indicated at 15, 16, 17, and 18. The edges of section 9 are beveled to provide cutting edges 19, 20. The bottom edge of portion 10 is beveled to form a cutting edge 21 which forms a continuation of the cutting edge 18 of the section 13 and merges into the outer end of the cutting edge 20 of portion 9. The sections 11, 12, and 13 constitute tines or rake teeth, diggers and cutters. The portion 9 provides a digger and cutter. The body part 7 forms a hoe. The edge 21, in connection with that edge 18 of which it forms a continuation, provides the body part 7 as a cutter.

The intermediate portion 10 of body part 7, between its transverse median and end portion 8, is provided with an upstanding extension 22. Integral with the outer face of extension 22 and the front of intermediate portion 10 is a rearwardly directed shank 23 adapted to have connected thereto a handle member 24. The shank 23 includes a depending, inwardly inclined, tapered front part 25 and a rear part 26. The part 25 is integral with the outer face of the intermediate portion 10 and extension 22. The part 26 is of compound curvature. The part 25 of shank 23 positions the body-part 7 at a rear inclination from its top to its bottom.

The body part, as constructed, will provide a V-shaped cutter at one end and a series of spaced V-shaped cutters at its other end.

The body part 7, in the position shown in Figure 2, provides a knife which will loosen and cut weeds. By inclining body part 7 to the left from the position shown in Figure 2, one may go closer to any vegetation and easily take away from it weeds or other matter which could not have been taken away without much labor. By turning the body part 7 from the position shown in Figure 2 in a direction whereby end portion 8 will be arranged above end portion 9, one may cultivate in between the plants and make furrows and holes for plants, and by turning body part 7 from the position shown in Figure 2 in a direction whereby portion 9 will be arranged above end portion 8, one may break hard, crusted ground and pick up weeds after they have been cut.

What I claim is:

1. In a cultivator, an upstanding substantially flat rectangular body of blade-like form, said blade having its lower portion formed with a cutting edge consisting of a continuous straight central part lengthwise thereof and a pair of oppositely disposed outwardly inclined upwardly extending end parts, said central part merging at its ends into the lower ends of said end parts and being of materially greater length than the said end parts, said blade inclining forwardly from its lower to its uper edge and provided intermediate the ends of its upper edge with an upstanding extension, a rearwardly directed shank for connection to a handle, said shank having a depending inwardly inclined front part disposed upon and transversely of the outer face of said body part, said inclined front part being positioned upon, lengthwise of and seated upon the upper edge of said extension, and said front part, body part and extension being integral with each other.

2. In a cultivator, an upstanding rectangular substantially flat body of blade-like form including an intermediate solid portion and a pair of end portions, one of said end portions consisting of a series of spaced flat parallel substantially oblong sections integral at their inner ends with said intermediate portion, said sections being separated by straight edge portions of said intermediate portion, each of said sections having a pointed outer end and beveled at its sides and outer end to form a cutting edge, said intermediate portion having its top edge formed with an upstanding extension, and a handle carrying means disposed at right angles to said sections, said handle carrying means including a part integral with the forward faces of said intermediate portion and extension and with the top edge of the extension.

3. In a cultivator, an upstanding substantially rectangular flat body of blade-like form consisting of an intermediate portion and a pair of end portions, said blade being formed with a cutting edge consisting of a continuous straight central part and a pair of oppositely disposed outwardly inclined upstanding extending end parts, said central part merging at its ends into the lower ends of said end parts, said central part being disposed throughout the lower edges of the said portions, said end parts being arranged on the said end portions, said intermediate portion having its top edge formed with an upstanding extension, and a handle carrying means including a part disposed transversely to said blade, the said part of said handle carrying means having its inner face integral with the outer faces of said intermediate portion and extension and being integral with the top edge of said extension.

ANTHONY MARSEILLES.